United States Patent
Nishio et al.

(10) Patent No.: US 10,692,630 B2
(45) Date of Patent: Jun. 23, 2020

(54) CABLE ASSEMBLY

(71) Applicant: Panasonic Intellectual Property Management Co., Ltd., Osaka (JP)

(72) Inventors: Toshiroh Nishio, Osaka (JP); Naoshi Usuki, Kyoto (JP); Satoshi Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/303,170

(22) PCT Filed: May 30, 2017

(86) PCT No.: PCT/JP2017/020014
§ 371 (c)(1),
(2) Date: Nov. 20, 2018

(87) PCT Pub. No.: WO2017/209098
PCT Pub. Date: Dec. 7, 2017

(65) Prior Publication Data
US 2019/0341172 A1  Nov. 7, 2019

(30) Foreign Application Priority Data
Jun. 1, 2016 (JP) .................... 2016-109862

(51) Int. Cl.
*H01B 11/22* (2006.01)
*G02B 6/44* (2006.01)
(Continued)

(52) U.S. Cl.
CPC ............ *H01B 11/22* (2013.01); *G02B 6/443* (2013.01); *H01B 7/0823* (2013.01); *H01R 24/60* (2013.01); *H01R 2107/00* (2013.01)

(58) Field of Classification Search
CPC ........................................................ H01B 11/22
(Continued)

(56) References Cited

U.S. PATENT DOCUMENTS

| 5,602,953 A * | 2/1997 | Delage ................ G02B 6/4403 |
| | | 174/27 |
| 6,210,047 B1 * | 4/2001 | Grois .................. G02B 6/3855 |
| | | 385/83 |

(Continued)

FOREIGN PATENT DOCUMENTS

| CN | 102326212 A | 1/2012 |
| CN | 102592745 A | 7/2012 |

(Continued)

OTHER PUBLICATIONS

The Extended European Search Report dated Apr. 15, 2019 for the related European Patent Application No. 17806652.8.
(Continued)

*Primary Examiner* — Stanley Tso
(74) *Attorney, Agent, or Firm* — McDermott Will & Emery LLP

(57) ABSTRACT

A cable assembly includes a cable, a connector that is provided at an end of the cable in a direction in which the cable extends, a plurality of electric transmission lines configured to transmit an electric signal, and a plurality of optical transmission lines configured to transmit an optical signal. The plurality of electric transmission lines and the plurality of optical transmission lines are provided in the cable assembly so as to extend across the cable and the connector. The plurality of optical transmission lines are provided so that at least one of the plurality of optical transmission lines is provided at each of ends of the cable assembly in a width direction perpendicular to the direction in which the cable extends. The plurality of electric trans-
(Continued)

mission lines are provided inside the plurality of optical transmission lines in the width direction.

8 Claims, 10 Drawing Sheets

(51) Int. Cl.
*H01B 7/08* (2006.01)
*H01R 24/60* (2011.01)
*H01R 107/00* (2006.01)

(58) Field of Classification Search
USPC .......................................... 174/74 R
See application file for complete search history.

(56) References Cited

U.S. PATENT DOCUMENTS

| | | | | |
|---|---|---|---|---|
| 2011/0194823 | A1* | 8/2011 | Wu | G02B 6/3817 385/92 |
| 2015/0219867 | A1 | 8/2015 | Ruan et al. | |
| 2016/0091669 | A1* | 3/2016 | Bullock | H01R 24/64 385/77 |
| 2018/0224617 | A1* | 8/2018 | Lee | H01B 11/22 |

FOREIGN PATENT DOCUMENTS

| | | |
|---|---|---|
| CN | 102592745 B | 9/2014 |
| CN | 204066876 U | 12/2014 |

OTHER PUBLICATIONS

International Search Report of PCT application No. PCT/JP2017/020014 dated Jun. 27, 2017.
High-Definition Multimedia Interface (HDMI; a registered trademark) Specification Version 1.3a, Nov. 10, 2006, [search on Dec. 1, 2015], Internet <URL:http://www.hdmi.org/manufacturer/specification.aspx>.
English Translation of Chinese Search Report dated Sep. 20, 2019 for the related Chinese Patent Application No. 201780033363.7.

\* cited by examiner

CABLE ASSEMBLY

CROSS-REFERENCE TO RELATED APPLICATIONS

This application is a U.S. national stage application of the PCT International Application No. PCT/JP2017/020014 filed on May 30, 2017, which claims the benefit of foreign priority of Japanese patent application No. 2016-109862 filed on Jun. 1, 2016, the contents all of which are incorporated herein by reference.

TECHNICAL FIELD

The present disclosure relates to a cable assembly that is a cable having a connector.

BACKGROUND ART

A high-definition multimedia interface (HDMI (registered trademark)) is a technique of a high-definition digital video-audio interface, and this technique is widely used for transmission of high-definition video-audio signals. An HDMI (registered trademark) standard (see NPL 1, for example) provides specifications of an HDMI (registered trademark) cable and an HDMI (registered trademark) connector, so that even when applicable versions of the standard differ, a shape of a connector of Type A, for example, is not changed. Therefore, an old audio-visual (AV) device and a new AV device can be connected by the HDMI (registered trademark) cable. Since the HDMI (registered trademark) standard provides high compatibility as described above, a cable, a connector, and the like that are compliant with the HDMI (registered trademark) standard are widely used.

CITATION LIST

Non-Patent Literature

NPL 1: HDMI (registered trademark) Specification Ver. 1.3a [retrieved Dec. 1, 2015], Internet <URL:http://www.hdmi.org/manufacturer/specification.aspx>

SUMMARY

The present disclosure provides a cable assembly that can transmit an electric signal and an optical signal, and can be provided with a connector that is compliant with the HDMI (registered trademark) standard while keeping a simple structure.

The cable assembly according to the present disclosure includes a cable, a connector that is provided at an end of the cable in a direction in which the cable extends, a plurality of electric transmission lines configured to transmit an electric signal, and a plurality of optical transmission lines configured to transmit an optical signal. The plurality of electric transmission lines and the plurality of optical transmission lines are provided so as to extend across the cable and the connector. The plurality of optical transmission lines are provided so that at least one of the plurality of optical transmission lines is provided at each of ends of the cable and the connector in a width direction perpendicular to the direction in which the cable extends. The plurality of electric transmission lines are provided inside the plurality of optical transmission lines in the width direction.

The present disclosure provides a cable assembly that can transmit an electric signal and an optical signal, and can be provided with a connector that is compliant with the HDMI (registered trademark) standard while keeping a simple structure.

DESCRIPTION OF EMBODIMENTS

A cable assembly according to the present disclosure is, for example, a cable having a connector used in a case where a signal having a relatively large volume of information such as a high-definition video-audio signal is transmitted at a high rate.

First, problems of a cable assembly are described by referring to a comparative example.

(Comparative Example)

Figure 1:
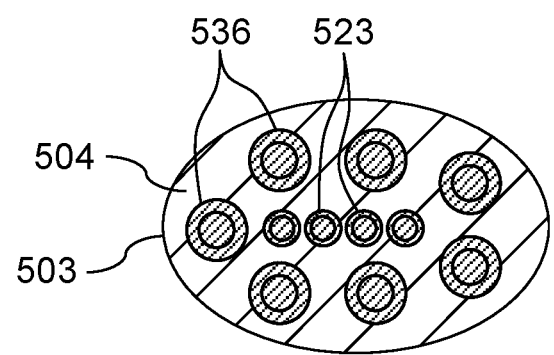
FIG. 1 is a cross-sectional view schematically illustrating a cross section of a cable according to a comparative example.

FIG. 1 is a cross-sectional view schematically illustrating a cross section of cable 503 according to the comparative example.

Cable 503 according to the comparative example includes a plurality of electric transmission lines (e.g., metal lines and the like) 536 that transmit an electric signal, a plurality of optical transmission lines (e.g., optical fibers and the like) 523 that transmit an optical signal, and covering part 504 that covers surroundings of electric transmission lines 536 and optical transmission lines 523. In cable 503, the plurality of (e.g., four) optical transmission lines 523 are disposed close to a center of cable 503, and the plurality of (e.g., seven) electric transmission lines 536 are disposed so as to surround optical transmission lines 523. With such a configuration of cable 503, breakage of optical transmission lines 523 can be suppressed.

It is assumed here that cable 503 according to the comparative example is coupled to a connector that is compliant with the HDMI (registered trademark) standard (as for an arrangement of each terminal of the connector, see FIG. 5 that will be described later). In this connector, the arrangement of electric terminals is determined based on the HDMI (registered trademark) standard, and ends of optical transmission lines 523 are disposed outside the electric terminals in width direction W (see FIG. 5) of the connector. Accordingly, electric transmission lines 536 need be drawn to a region that is inside optical transmission lines 523 and optical transmission lines 523 need be drawn out to a region outside the electric terminals in the connector in order that electric transmission lines 536 of cable 503 correspond to the arrangement of the electric terminals.

In such a case, a complex structure in which optical transmission lines 523 and electric transmission lines 536 cross each other is generated in the connector. It may be therefore difficult to make lengths of optical transmission lines 523 equal to one another. In a case where the lengths of optical transmission lines 523 are not equal to one another, phases of optical signals are harder to agree with one another. This sometimes decreases transmission efficiency of the optical signals, and thus making it difficult to transmit a signal having an enormous volume of information at a high rate.

According to the present disclosure, a cable assembly can have a simple structure. This makes it possible to make dimensional differences among lengths of optical transmission lines relatively small, and thus improving transmission efficiency of a signal.

(First Exemplary Embodiment)

Next, a cable assembly according to the present disclosure is described with reference to the drawings. However, detailed descriptions that are more than necessary may be omitted. For example, a detailed description of a matter that has been already well-known, or an overlapped description for a substantially identical configuration may be omitted. This is intended to avoid unnecessary redundancy of the following description and to facilitate understanding by those skilled in the art.

It is also to be noted that the following exemplary embodiments and the appended drawings are merely illustrative of the cable assembly of the present disclosure. Therefore, the scope of the present disclosure is defined by the recitations in the claims with the following exemplary embodiments used as references and thus is not limited to the following exemplary embodiments only. Therefore, among constituent elements in the following exemplary embodiment, constituent elements that are not recited in any one of the independent claims indicating the most generic concepts of the present disclosure are not necessarily essential for achievement of the object of the present disclosure but are described as preferable components.

The drawings are schematic views in which emphasis, omission, and proportion adjustment are made as required for illustration of the present disclosure and may have shapes, positional relationships and proportions that differ from actual shapes, actual positional relationships, and actual proportions. Further, in the respective drawings, substantially identical components are denoted by identical reference marks, and descriptions of those components may be omitted or simplified.

[1-1. Configuration of Cable Assembly]

First, an outline configuration of a cable assembly is described below.

Figure 2:
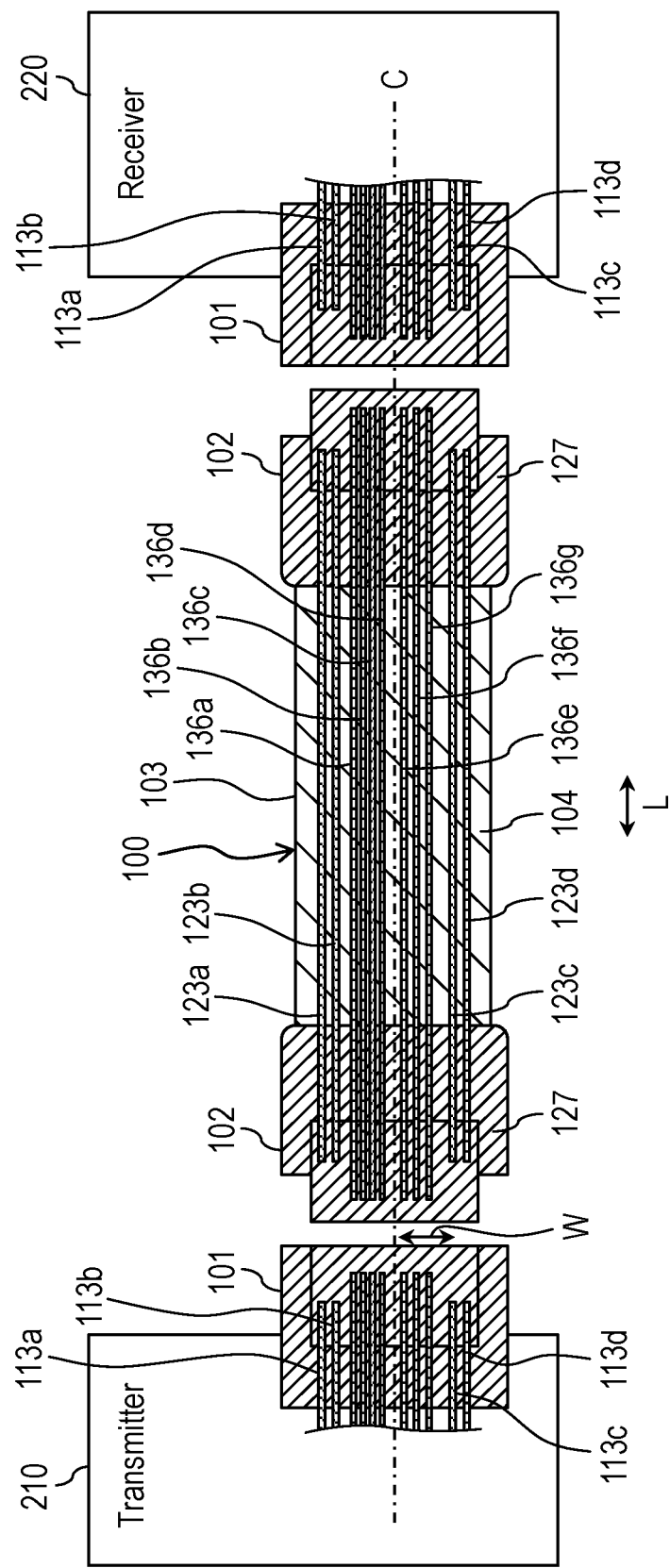
FIG. 2 is a view schematically illustrating a cable assembly according to a first exemplary embodiment and a transmitter and a receiver that are connected to each other by the cable assembly.

FIG. 2 is a view schematically illustrating cable assembly 100 according to the first exemplary embodiment and transmitter 210 (e.g., video signal transmitter) and receiver 220 (e.g., video signal receiver) that are connected to each other by cable assembly 100.

As illustrated in FIG. 2, cable assembly 100 includes cable 103, connector 102 that is provided at an end of cable 103 in direction L in which cable 103 extends, a plurality of (e.g., seven) electric transmission lines 136*a*, 136*b*, 136*c*, 136*d*, 136*e*, 136*f*, and 136*g* that transmit an electric signal, and a plurality of (e.g., four) optical transmission lines 123*a*, 123*b*, 123*c*, and 123*d* that transmit an optical signal. In cable assembly 100 according to the present exemplary embodiment, connector 102 is provided at both ends of cable 103 as illustrated in FIG. 2. These connectors 102 are plugs and are compliant with the HDMI (registered trademark) standard.

Transmitter 210 and receiver 220 each have connector 101 connected to connector 102. These connectors 101 are receptacles and are compliant with the HDMI (registered trademark) standard. Connector 102 at one end of cable 103 is connected to connector 101 of transmitter 210, and connector 102 at the other end of cable 103 is connected to connector 101 of receiver 220. This connects transmitter 210 and receiver 220, thus enabling transmission of information between transmitter 210 and receiver 220.

Electric transmission lines 136*a* through 136*g* and optical transmission lines 123*a* through 123*d* are provided in cable 103 and connectors 102 so as to extend across cable 103 and connectors 102.

Electric transmission lines 136*a* through 136*g* and optical transmission lines 123*a* through 123*d* each have a part that constitutes cable 103 and is covered with covering part 104 and a part that constitute connector 102 and is covered with resin mold part 127. Covering part 104 is made of a resin material that is more flexible than resin mold part 127. Accordingly, cable 103 has flexibility and can be bent. In the following description, however, it is assumed that cable 103 is disposed linearly as illustrated in FIG. 2. That is, direction L is a direction in which cable 103 disposed linearly extends.

Each of optical transmission lines 123*a* through 123*d* is, for example, an optical fiber made of plastic and has, for example, a diameter of approximately 0.5 mm.

Optical transmission lines 123*a* through 123*d* are provided so that at least one of the optical transmission lines is provided at each of ends of cable assembly 100 in direction (width direction) W perpendicular to direction L in which cable 103 extends. Specifically, two optical transmission lines 123*a* and 123*b* are disposed outside (above in FIG. 2) outermost (uppermost in FIG. 2) electric transmission line 136*a* in width direction W among electric transmission lines 136*a* through 136*g*, and two optical transmission lines 123*c* and 123*d* are disposed outside (below in FIG. 2) outermost (lowermost in FIG. 2) electric transmission line 136*g* in width direction W among electric transmission lines 136*a* through 136*g*.

Optical transmission lines 123*a* through 123*d* are provided parallel with one another along direction L in which cable 103 extends.

Optical transmission lines 123*a* and 123*b* and optical transmission lines 123*c* and 123*d* are disposed in line symmetry with respect to central line C of cable 103 parallel with direction L in which cable 103 extends when viewed from a direction (height direction H in FIG. 3) perpendicular to both of direction L in which cable 103 extends and width direction W. That is, in cable assembly 100, a line located at a midpoint between outermost optical transmission lines 123*a* and 123*d* in width direction W among optical transmission lines 123*a* through 123*d* is equal to central line C parallel with direction L in which cable 103 extends, and optical transmission lines 123*b* and 123*c* are disposed in line symmetry with respect to central line C.

Each of optical transmission lines 123*a* through 123*d* has a linear shape when viewed from a direction (height direction H) perpendicular to both of direction L in which cable 103 extends and width direction W. That is, each of optical transmission lines 123a through 123d has a linear shape from connector 102 at one end to connector 102 at the other end across cable 103 when viewed from height direction H.

Figure 4:
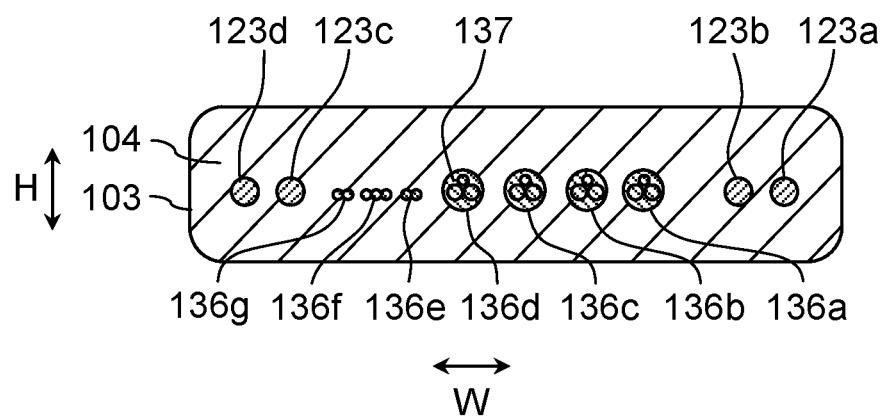
FIG. 4 is a cross-sectional view schematically illustrating a cross section of a cable of the cable assembly in FIG. 3.

Each of electric transmission lines 136a through 136g includes a metal line (e.g., a copper line and the like) so that an electric signal can be transmitted. Each of electric transmission lines 136a through 136g has, for example, a diameter of approximately 0.1 mm to 1 mm. Part of or all of electric transmission lines 136a through 136g may be covered with a resin tube or the like. FIG. 4 illustrates an example of a configuration in which electric transmission lines 136a through 136d are covered with resin tube 137. In the present exemplary embodiment, an example of a configuration in which electric transmission lines 136a through 136d have a relatively large diameter (e.g., 1 mm), and electric transmission lines 136e through 136g have a relatively small diameter (e.g., 0.1 mm) is illustrated. However, the present disclosure is not limited at all to this configuration. All of electric transmission lines 136a through 136g may have an identical diameter or the electric transmission lines may have three or more different diameters.

Electric transmission lines 136a through 136g are disposed in parallel with one another in width direction W between optical transmission line 123b and optical transmission line 123c. Electric transmission lines 136a through 136g are disposed so as to correspond to the arrangement of the electric terminals of connector 102 that is compliant with the HDMI (registered trademark) standard.

Next, a detailed configuration of cable assembly 100 is described below.

Figure 3:
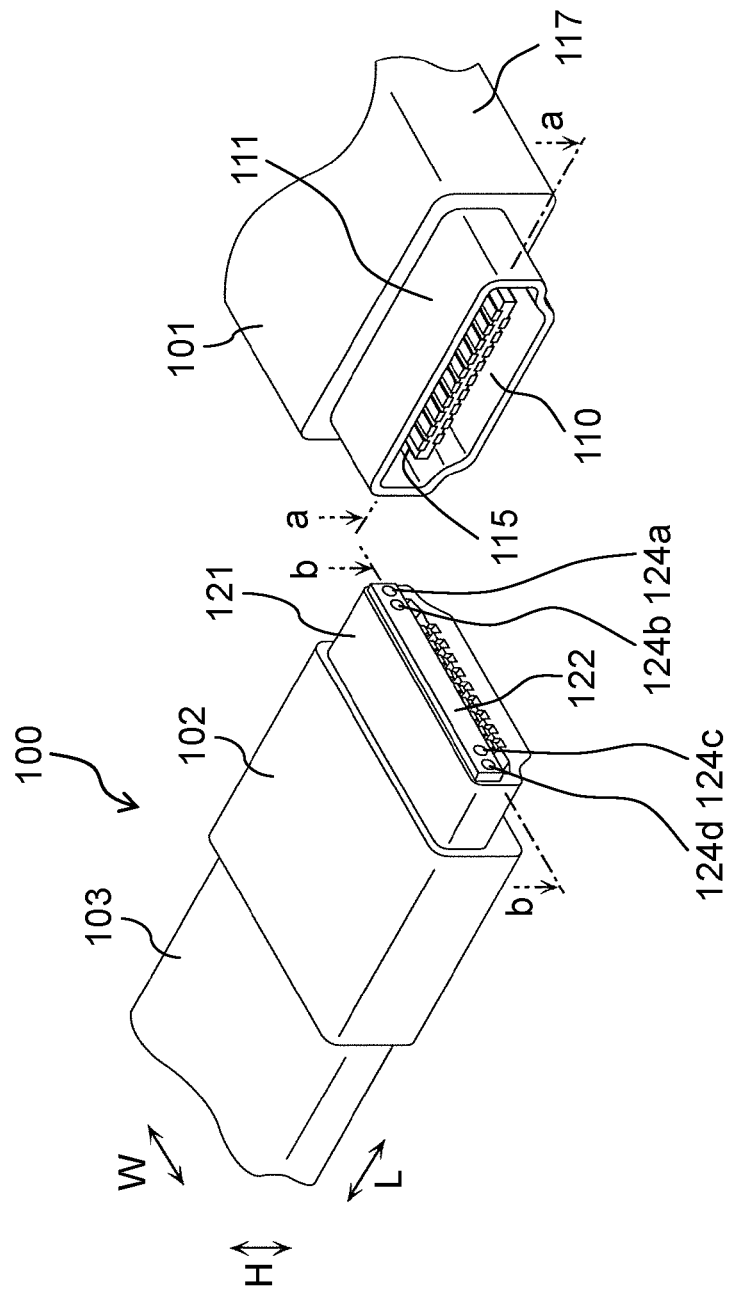
FIG. 3 is a view schematically illustrating a state where a connector of the cable assembly according to the first exemplary embodiment is detached from a connector of the transmitter (or the receiver).

FIG. 3 is a view schematically illustrating a state where connector 102 of cable assembly 100 according to the first exemplary embodiment is detached from connector 101 of transmitter 210 (or receiver 220).

FIG. 4 is a cross-sectional view schematically illustrating a cross section of cable 103 of cable assembly 100 in FIG. 3.

As illustrated in FIG. 4, cable 103 is a flat cable whose surfaces facing each other in height direction H are flat. As for optical transmission lines 123a through 123d, two optical transmission lines are provided at each of the ends of cable 103 in width direction W. Specifically, optical transmission lines 123a and 123b are provided at one end of cable 103 in width direction W, and optical transmission lines 123c and 123d are provided at the other end of cable 103 in width direction W. Electric transmission lines 136a through 136g are provided between (i.e., inside) optical transmission line 123b and optical transmission line 123c in width direction W. Optical transmission lines 123a through 123d and electric transmission lines 136a through 136g are covered with covering part 104.

Figure 5:
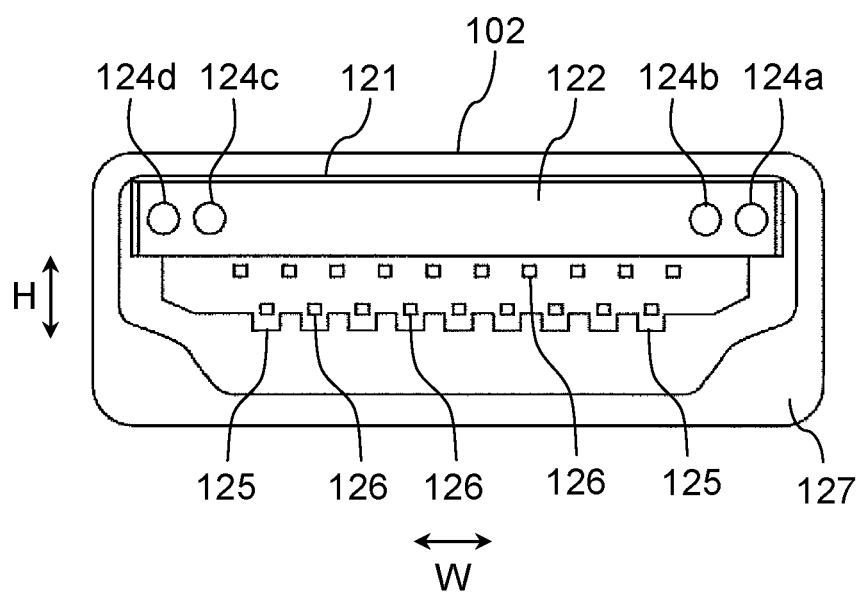
FIG. 5 is a front view of the connector of the cable assembly in FIG. 3.

FIG. 5 is a front view of connector 102 of cable assembly 100 in FIG. 3.

Figure 6:
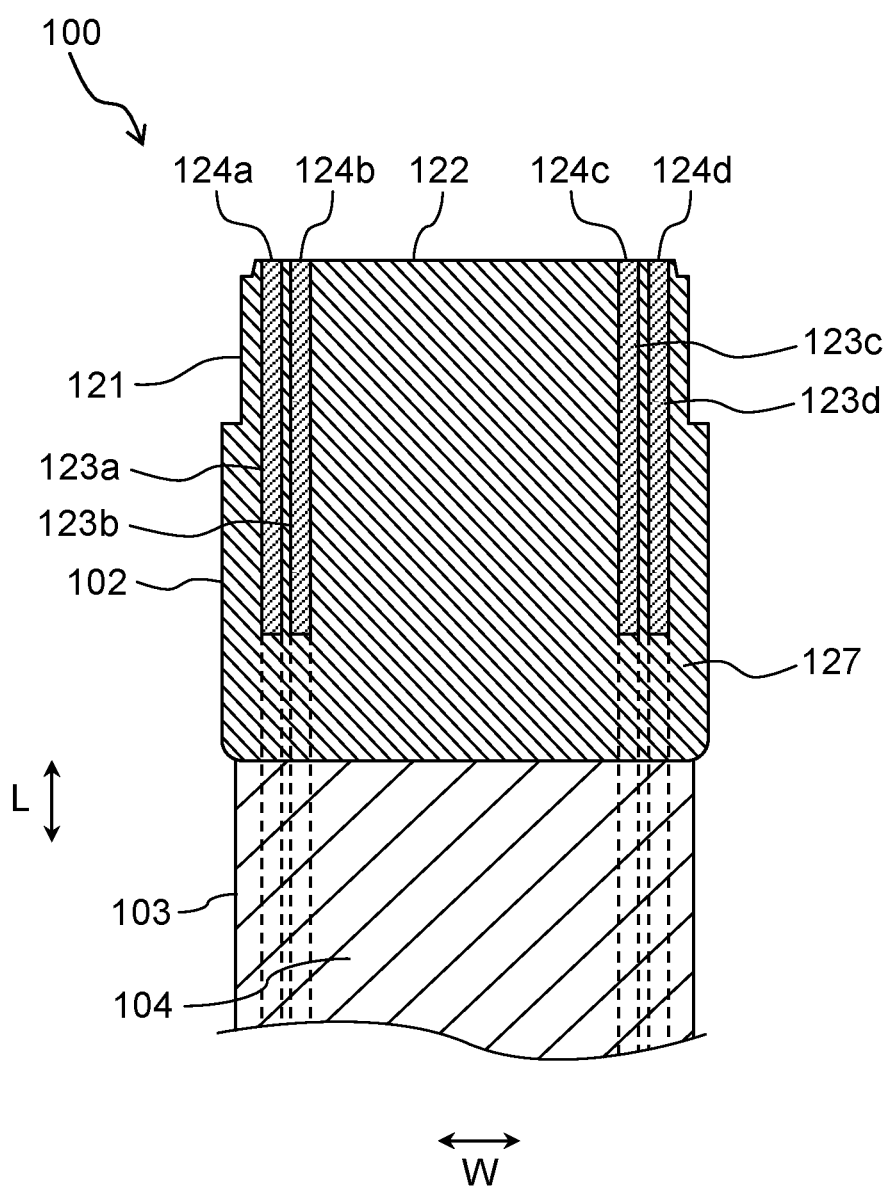
FIG. 6 is a cross-sectional view of the cable assembly taken along line b-b in FIG. 3.

FIG. 6 is a cross-sectional view of cable assembly 100 taken along line b-b in FIG. 3. In FIG. 6, only optical transmission lines 123a through 123d are illustrated, and illustration of electric transmission lines 136a through 136g is omitted.

As illustrated in FIG. 3, connector 102 is a member that is connectable to connector 101 of transmitter 210 (or receiver 220). As illustrated in FIGS. 3, 5, and 6, connector 102 includes insertion part 121, projection 122, a plurality of electric terminals 126, a plurality of slots 125, part (not illustrated) of each of electric transmission lines 136a through 136g, part of each of optical transmission lines 123a through 123d, resin mold part 127, and ends 124a through 124d. Ends 124a through 124d are ends of optical transmission lines 123a through 123d that are exposed on a surface of projection 122.

Insertion part 121 has a shape that can be inserted into tubular body 111 of connector 101. Specifically, insertion part 121 is shaped to comply with the HDMI (registered trademark) standard and is held in tubular body 111 by being inserted into tubular body 111 of connector 101.

Projection 122 is provided at an end of insertion part 121 and is shaped to project from the end of insertion part 121 in direction L in which cable 103 extends, as illustrated in FIGS. 3, 5, and 6. Projection 122 is formed to be capable of fitting into recessed part 112 (see FIGS. 7 and 8) provided in connector 101.

In connector 102, the plurality of electric terminals 126 are arranged in compliance with the HDMI (registered trademark) standard. Electric terminals 126 are attached to connector 102 so as to protrude in an insertion direction so that bias force toward electric terminals 116 (see FIG. 7) of connector 101 is generated, thus ensuring electric connection with electric terminals 116 when insertion part 121 of connector 102 is inserted into tubular body 111 of connector 101 of transmitter 210 (or receiver 220).

Slots 125 are groove-shaped parts formed in an inner wall surface of insertion part 121 of connector 102. Slots 125 serve as margins into which electric terminals 126 escape when insertion part 121 of connector 102 is inserted into tubular body 111 of connector 101 of transmitter 210 (or receiver 220) and electric terminals 126 spreads out by being pressed by contact with electric terminals 116 provided in connector 101.

A plurality of metal lines of electric transmission lines 136a through 136g correspond to the respective plurality of electric terminals 126 and are electrically connected to respective electric terminals 126. In the present exemplary embodiment, connector 102 includes nineteen electric terminals 126, and electric transmission lines 136a through 136g have nineteen metal lines in total (e.g., electric transmission lines 136a through 136d and 136f each have three metal lines, and electric transmission lines 136e and 136g each have two metal lines). The nineteen metal lines are electrically connected to nineteen electric terminals 126, respectively.

As for optical transmission lines 123a through 123d, two optical transmission lines are provided at each of the ends of connector 102 in width direction W, as illustrated in FIG. 6. Each of optical transmission lines 123a through 123d has a linear shape from cable 103 to projection 122 of connector 102 when viewed from a direction (height direction H) perpendicular to both of direction L in which cable 103 extends and width direction W. As illustrated in FIG. 5, ends 124a through 124d of respective optical transmission lines 123a through 123d are exposed on projection 122, and ends 124a through 124d are located outside electric terminals 126 in width direction W (two ends are provided at each of the sides) so as to correspond to the positions of optical transmission lines 123a through 123d.

Positions in height direction H of optical transmission lines 123a through 123d in projection 122 are different from positions in height direction H of optical transmission lines 123a through 123d in cable 103 when cable assembly 100 is viewed from width direction W. Accordingly, optical transmission lines 123a through 123d each have, in connector 102, an inclined part for shifting from cable 103 to projection 122 (not illustrated).

[1-2. Configuration of Connection Between Connector of Transmitter (or Receiver) and Connector of Cable Assembly]

Figure 7:
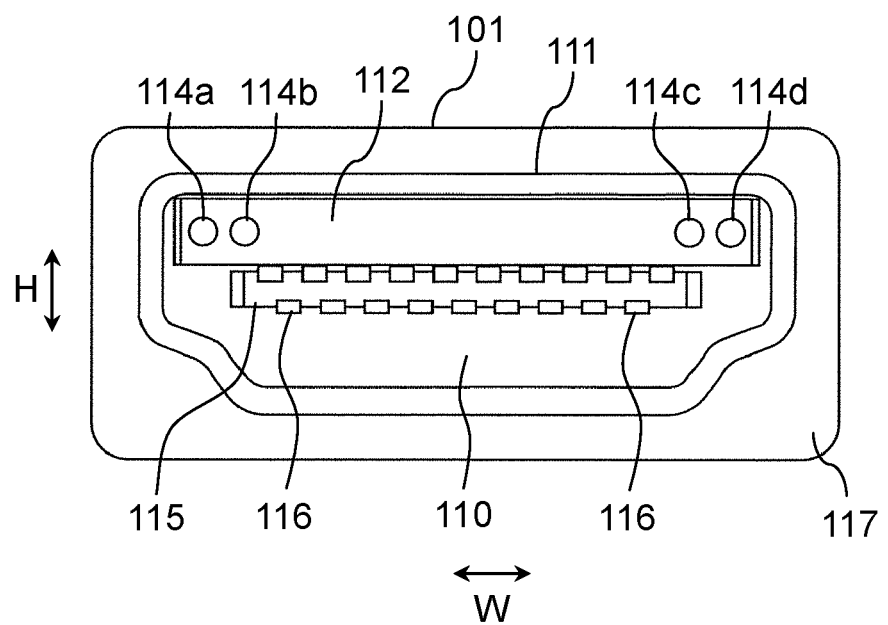
FIG. 7 is a front view of the connector of the transmitter (or the receiver) in FIG. 3.

FIG. 7 is a front view of connector 101 of transmitter 210 (or receiver 220) in FIG. 3.

Figure 8:
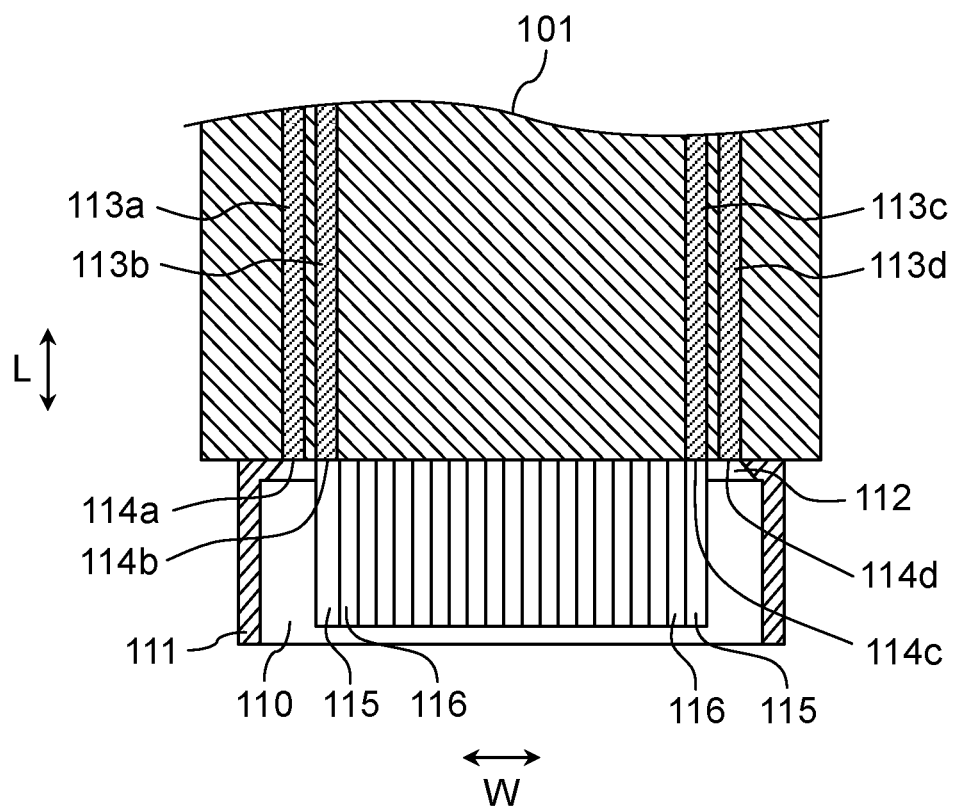
FIG. 8 is a cross-sectional view of the connector of the transmitter (or receiver) taken along line a-a in FIG. 3.

FIG. 8 is a cross-sectional view of connector 101 of transmitter 210 (or receiver 220) taken along line a-a in FIG. 3. In FIG. 8, only optical transmission lines 113a through 113d are illustrated, and illustration of electric transmission lines is omitted.

Connector 101 of transmitter 210 (or receiver 220) includes tubular body 111, recessed part 112, substrate 115, the plurality of electric terminals 116, the plurality of optical transmission lines 113a through 113d, and ends 114a through 114d. Ends 114a through 114d are ends of optical transmission lines 113a through 113d that are exposed on a surface of recessed part 112. Parts of optical transmission lines 113a through 113d are covered with resin mold part 117.

Tubular body 111 is a tubular member and forms holding space 110 that enables insertion of insertion part 121 of connector 102. Tubular body 111 forms holding space 110 having a shape that is compliant with the HDMI (registered trademark) standard and can hold connector 102 in a state where insertion part 121 of connector 102 is inserted into holding space 110.

Recessed part 112 has a shape into which projection 122 of connector 102 can be fitted, and recessed part 112 is a part into which projection 122 provided at an end of insertion part 121 is fitted when insertion part 121 of connector 102 is inserted into holding space 110.

Electric terminals 116 are arranged on substrate 115 in compliance with the HDMI (registered trademark) standard. To electric terminals 116, wires (electric transmission lines) of transmitter 210 or receiver 220 are electrically connected.

Substrate 115 is an insulating member holding the plurality of arranged electric terminals 116 and includes the plurality of electric terminals 116 on each of front surface and back surface of substrate 115. When substrate 115 is inserted into insertion part 121 of connector 102 inserted into holding space 110 of tubular body 111, each of electric terminals 116 is electrically connected to corresponding one of electric terminals 126 of connector 102.

Optical transmission lines 113a through 113d are transmission lines that transmit an optical signal. Each of optical transmission lines 113a through 113d is, for example, an optical fiber made of plastic and has, for example, a diameter of approximately 0.5 mm Ends 114a through 114d of optical transmission lines 113a through 113d are exposed on recessed part 112 and are disposed at positions corresponding to ends 124a through 124d of optical transmission lines 123a through 123d provided on insertion part 121 of connector 102 inserted into holding space 110 of tubular body 111.

As for optical transmission lines 113a through 113d, two optical transmission lines are provided at each of ends of connector 101 in width direction W. Specifically, optical transmission lines 113a through 113d are provided outside electric terminals 116 in width direction W (two optical transmission lines are provided at each of the sides) in connector 101.

Connector 102 of cable assembly 100 according to the present exemplary embodiment configured as above and connector 101 of transmitter 210 (or receiver 220) are connected to each other.

Figure 9:
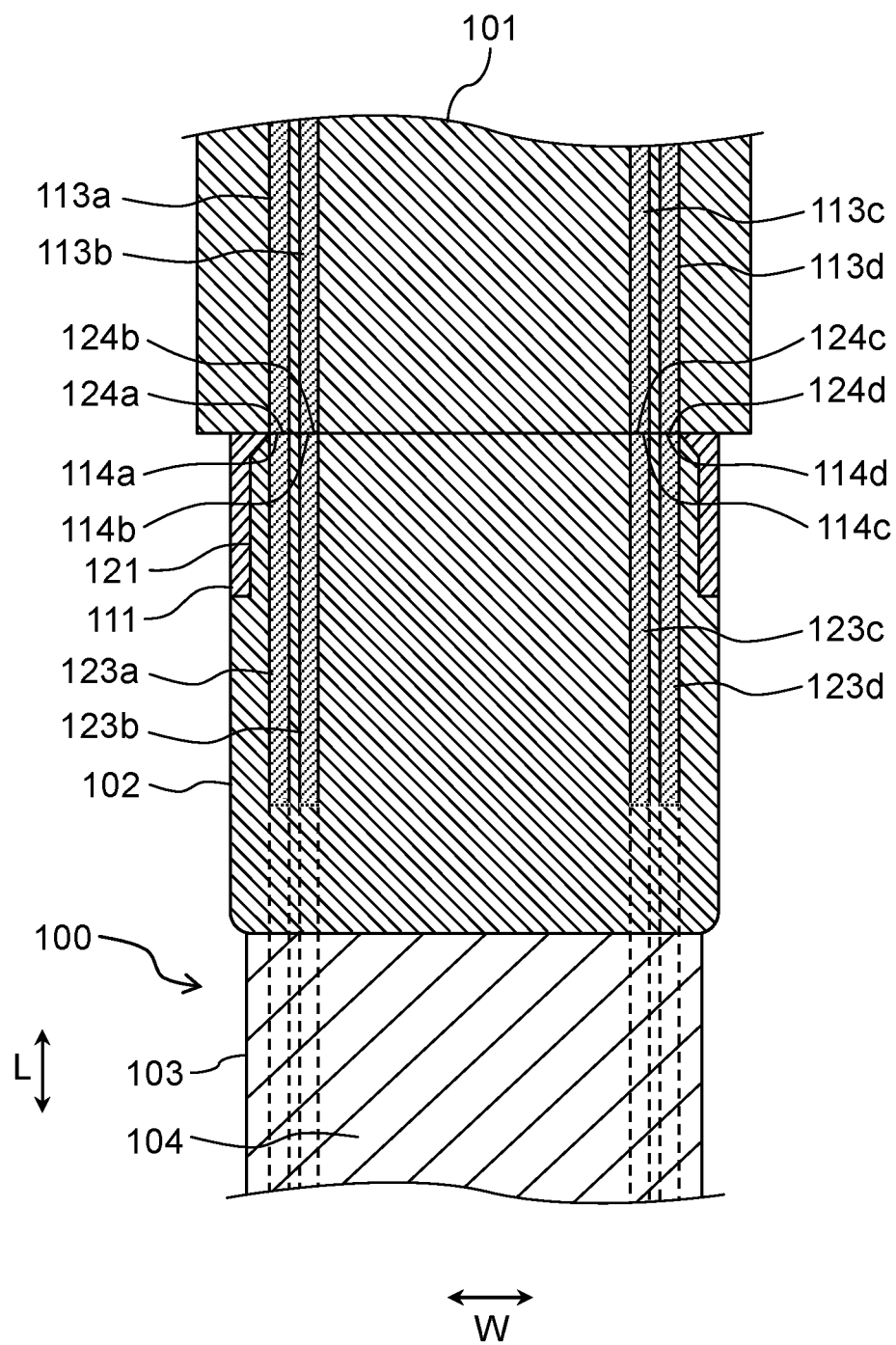
FIG. 9 is a cross-sectional view schematically illustrating a state of connection between the connector of the cable assembly according to the first exemplary embodiment and the connector of the transmitter (or the receiver).

FIG. 9 is a cross-sectional view schematically illustrating a state of connection between connector 102 of cable assembly 100 according to the first exemplary embodiment and connector 101 of transmitter 210 (or receiver 220). In FIG. 9, only optical transmission lines 123a through 123d of cable assembly 100 and optical transmission lines 123a through 123d of connector 101 are illustrated, and illustration of electric transmission lines 136a through 136g of cable assembly 100 and the electric transmission lines of connector 101 is omitted.

As illustrated in FIG. 9, when insertion part 121 of connector 102 is inserted into tubular body 111 of connector 101 of transmitter 210 (or receiver 220), connector 102 and connector 101 are connected to each other. The connection causes ends 124a through 124d of optical transmission lines 123a through 123d of cable assembly 100 and ends 114a through 114d of optical transmission lines 113a through 113d of connector 101 to face each other, thus enabling transmission of an optical signal between optical transmission lines 123a through 123d and optical transmission lines 113a through 113d. This allows information to be transmitted by an optical signal, between transmitter 210 and receiver 220 that are connected to each other through cable assembly 100 as illustrated in FIG. 2, through optical transmission lines 123a through 123d of cable assembly 100 and ends 124a through 124d and ends 114a through 114d that face each other at a connection part between connector 102 and connector 101. Connection between connector 102 and connector 101 causes electric terminals 126 of connector 102 and electric terminals 116 of connector 101 to be electrically connected to each other, thus making it possible to transmit information by using an electric signal between transmitter 210 and receiver 220 through electric transmission lines 136a through 136g of cable assembly 100.

[1-3. Effects and Others]

As described above, in the present exemplary embodiment, the cable assembly includes a cable, a connector that is provided at an end of the cable in a direction in which the cable extends, a plurality of electric transmission lines configured to transmit an electric signal, and a plurality of optical transmission lines configured to transmit an optical signal. The plurality of electric transmission lines and the plurality of optical transmission lines are provided so as to extend across the cable and the connector. The plurality of optical transmission lines are provided so that at least one of the plurality of optical transmission lines is provided at each of ends of the cable and the connector in a width direction perpendicular to the direction in which the cable extends. The plurality of electric transmission lines are provided inside the plurality of optical transmission lines in the width direction.

Cable assembly 100 is an example of the cable assembly. Cable 103 is an example of the cable. Connector 102 is an example of the connector. Electric transmission lines 136a through 136g are an example of the electric transmission lines. Optical transmission lines 123a through 123d are an example of the optical transmission lines.

For example, in the example illustrated in the first exemplary embodiment, cable assembly 100 includes cable 103, connector 102 that is provided at an end of cable 103 in direction L in which cable 103 extends, a plurality of electric transmission lines 136a through 136g that transmit an electric signal, and a plurality of optical transmission lines 123a through 123d that transmit an optical signal. The plurality of electric transmission lines 136a through 136g and the plurality of optical transmission lines 123a through 123d are provided so as to extend across cable 103 and connector 102. The plurality of optical transmission lines 123a through 123d are provided so that at least one of the plurality of optical transmission lines is provided at each of ends of cable 103 and connector 102 in width direction W perpendicular to direction L in which cable 103 extends. The plurality of electric transmission lines 136a through 136g are provided inside the plurality of optical transmission lines 123a through 123d in width direction W.

For example, in the comparative example illustrated in FIG. 1, in a case where the connector provided in cable 503 is compliant with the HDMI (registered trademark) standard, optical transmission lines 523 need be drawn out to a region outside the electric terminals. This produces a region where optical transmission lines 523 and the electric terminals cross each other in the connector. Meanwhile, in cable assembly 100 configured as above, optical transmission lines 123a through 123d are provided at ends (outside electric transmission lines 136a through 136g) of cable 103 and connector 102 in width direction W. Therefore, even in a case where connector 102 that is compliant with the HDMI (registered trademark) standard is provided, optical transmission lines 123a through 123d and electric transmission lines 136a through 136g need not cross each other in cable assembly 100. It is therefore possible to keep a simple structure. This makes it possible to make lengths of wires of optical transmission lines 123a through 123d in connector 102 in cable assembly 100 shorter than those in the comparative example illustrated in FIG. 1, thus reducing dimensional differences among the wires. This makes it possible to improve transmission efficiency of an optical signal in cable assembly 100.

Furthermore, since in cable assembly 100, optical transmission lines 123a through 123d are provided at ends (outside electric transmission lines 136a through 136g) in width direction W of cable assembly 100, a light shielding mechanism (e.g., a shutter or the like), a dust removing mechanism (e.g., brush or the like), or the like for ends 124a through 124d of optical transmission lines 123a through 123d can be more easily provided, for example, in connector 102 than the configuration in which optical transmission lines 523 are provided close to a center (inside electric transmission lines 536) of cable 503 as in the comparative example illustrated in FIG. 1. Furthermore, it is easier to do maintenance such as cleaning of ends 124a through 124d of optical transmission lines 123a through 123d.

In the cable assembly, each of the plurality of optical transmission lines may be provided in parallel with one another along the direction in which the cable extends.

For example, in the example illustrated in the first exemplary embodiment, in cable assembly 100, each of the plurality of optical transmission lines 123a through 123d is provided in parallel with one another along direction L in which cable 103 extends.

In cable assembly 100 configured as above, it is possible to reduce dimensional differences among lengths of optical transmission lines 123a through 123d, thus improving transmission efficiency of an optical signal in cable assembly 100.

In the cable assembly, each of the plurality of optical transmission lines may have a linear shape when viewed from a direction perpendicular to both of the direction in which the cable extends and the width direction.

For example, in the example illustrated in the first exemplary embodiment, in cable assembly 100, each of the plurality of optical transmission lines 123a through 123d has a linear shape when viewed from a direction (height direction H) perpendicular to both of direction L in which cable 103 extends and width direction W.

In cable assembly 100 configured as above, it is possible to reduce dimensional differences among lengths of optical transmission lines 123a through 123d, thus improving transmission efficiency of an optical signal in cable assembly 100.

In the cable assembly, the plurality of optical transmission lines may be disposed in line symmetry with respect to a central line of the cable parallel with the direction in which the cable extends when viewed from a direction perpendicular to both of the direction in which the cable extends and the width direction.

For example, in the example illustrated in the first exemplary embodiment, in cable assembly 100, the plurality of optical transmission lines 123a through 123d are disposed in line symmetry with respect to central line C of cable 103 parallel with direction L in which cable 103 extends when viewed from a direction (height direction H) perpendicular to both of direction L in which cable 103 extends and width direction W.

In cable assembly 100 configured as above, optical transmission lines 123a through 123d are disposed in a well-balanced manner in cable assembly 100. This makes it possible to improve uniformity of strength in cable assembly 100.

In the cable assembly, the cable may be a flat cable.

For example, in the example illustrated in the first exemplary embodiment, cable 103 is a flat cable in cable assembly 100.

In cable assembly 100 configured as above, cable 103 can be made thin. Furthermore, it is easy to adjust flexibility of covering part 104 that covers electric transmission lines 136a through 136g and optical transmission lines 123a through 123d so as to reduce damage on optical transmission lines 123a through 123d by regulating direction and amount of bending of cable 103 while giving flexibility to cable 103.

In the cable assembly, the connector may have a plurality of electric terminals configured to be electrically connected to the respective plurality of electric transmission lines, and each of the plurality of electric terminals may be arranged in compliance with the HDMI (registered trademark) standard. The plurality of optical transmission lines may be provided outside the plurality of electric terminals in the width direction in the connector.

For example, in the example illustrated in the first exemplary embodiment, in cable assembly 100, connector 102 has a plurality of electric terminals 126 configured to be electrically connected to the respective plurality of electric transmission lines 136a through 136g, and each of the plurality of electric terminals 126 is arranged in compliance with the HDMI (registered trademark) standard. The plurality of optical transmission lines 123a through 123d are provided outside the plurality of electric terminals 126 in width direction W in connector 102.

In cable assembly 100 configured as above, an optical signal can be transmitted by using a connector that is compliant with the HDMI (registered trademark) standard.

(Modification of First Exemplary Embodiment)

Next, a cable assembly according to a modification of the first exemplary embodiment is described below. It should be noted that, in the following description, components that are substantially identical to the components included in cable assembly 100 described in the first exemplary embodiment have the same reference marks, and that descriptions of those components may be omitted. In addition, descriptions of matters described in the first exemplary embodiment may be omitted and matters differ from the matters in the first exemplary embodiment are mainly described.

A cable of the cable assembly may have a covering part that covers a plurality of electric transmission lines and a plurality of optical transmission lines, and a buffer material may be provided between each of the plurality of optical transmission lines and the covering part.

Figure 10:
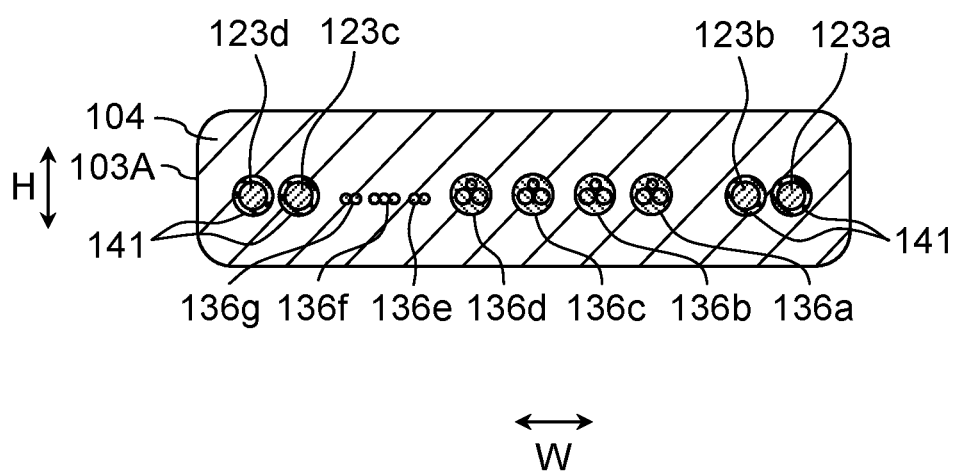
FIG. 10 is a cross-sectional view schematically illustrating a cross section of a cable of a cable assembly according to a modification of the first exemplary embodiment.

FIG. 10 is a cross-sectional view schematically illustrating a cross section of cable 103A of the cable assembly according to the modification of the first exemplary embodiment.

Cable 103A according to the present modification includes covering part 104 that covers a plurality of electric transmission lines 136a through 136g and a plurality of optical transmission lines 123a through 123d, and buffer material 141 that covers optical transmission lines 123a through 123d is provided between each of the plurality of optical transmission lines 123a through 123d and covering part 104.

A material of which buffer material 141 is made is, for example, a resin that is more flexible than covering part 104. A dimension in height direction H of buffer material 141 that covers optical transmission lines 123a through 123d may be almost equal to a dimension of electric transmission lines 136a through 136d having a relatively large dimension in height direction H among electric transmission lines 136a through 136g.

By thus protecting optical transmission lines 123a through 123d by using buffer material 141, it is possible to reduce damage caused on optical transmission lines 123a through 123d when cable 103A is bent. Furthermore, in a case where buffer material 141 and electric transmission lines 136a through 136d have a substantially equal dimension in height direction H as illustrated in FIG. 10, it is possible to reduce a difference between stress applied to optical transmission lines 123a through 123d and stress applied to electric transmission lines 136a through 136d in cable 103A when cable 103A is bent. This makes it possible to further reduce damage caused on optical transmission lines 123a through 123d when cable 103A is bent.

(Other Exemplary Embodiments)

The first exemplary embodiment and the modification have been described above as illustrations of the technique disclosed in the present application. However, the present disclosure is not limited to the above-mentioned exemplary embodiment. For example, other exemplary embodiments that are realized by combining the constituent elements of choice that are described in this description or omitting some of the constituent elements may also be exemplary embodiments of the present disclosure. In addition, modifications obtainable by various changes to the above exemplary embodiments that are conceived by those skilled in the art without departing from the essence of the present disclosure, that is to say, the meaning of the recitations in the claims are also included in the present disclosure.

Therefore, other exemplary embodiments are described below.

Although an example of a configuration in which connector 102 of cable assembly 100 is a plug has been described in the first exemplary embodiment, the present disclosure is not limited to this configuration. For example, connector 102 provided at an end of cable 103 may be a receptacle. That is, connector 102 is either a plug or a receptacle. For example, in a case where connector 102 is a plug, connector 101 to which connector 102 is connected is a receptacle, and in a case where connector 102 is a receptacle, connector 101 is a plug.

Although an example of a configuration in which two optical transmission lines are provided at each of ends of cable assembly 100 has been described in the first exemplary embodiment, the present disclosure is not limited to this configuration. For example, the number of optical transmission lines provided at each of the ends of cable assembly 100 may be one or may be three or more.

As described above, the exemplary embodiments have been described to exemplify the technique disclosed in the present disclosure. The accompanying drawings and detailed description are provided for the description.

Therefore, the components described in the accompanying drawings and the detailed description include not only the components essential for solving the problem but also components that are not essential for solving the problem in order to illustrate the techniques. For this reason, those nonessential components that are illustrated in the accompanying drawings and are described in the detailed description should not be immediately acknowledged as essential.

Further, since the above exemplary embodiments illustrate the technique in the present disclosure, various modifications, substitutions, additions and omissions can be made within the scope of claims and equivalent scope of claims.

INDUSTRIAL APPLICABILITY

The present disclosure is applicable, for example, to a cable assembly used to transmit high-definition video and audio signals.

REFERENCE MARKS IN THE DRAWINGS

100: cable assembly
101, 102: connector
103, 103A, 503: cable
104, 504: covering part
110: holding space
111: tubular body
112: recessed part
113a, 113b, 113c, 113d, 123a, 123b, 123c, 123d, 523: optical transmission line
114a, 114b, 114c, 114d, 124a, 124b, 124c, 124d: end
115: substrate
116, 126: electric terminal
117, 127: resin mold part
121: insertion part
122: projection
125: slot
136a, 136b, 136c, 136d, 136e, 136f, 136g, 536: electric transmission line
137: resin tube
141: buffer material
210: transmitter
220: receiver
H: height direction
L: extension direction
W: width direction

The invention claimed is:
1. A cable assembly comprising:
a cable;
a connector that is provided at an end of the cable in a direction in which the cable extends;
a plurality of electric transmission lines each configured to transmit an electric signal; and
first optical transmission line group consisting of one or more optical transmission lines each configured to transmit an optical signal; and second optical transmission line group consisting of one or more optical transmission lines each configured to transmit an optical signal, wherein the plurality of electric transmission lines and the optical transmission lines included in the first optical transmission line group and the second optical transmission line group are aligned in parallel inside the cable and the connector, and are provided so as to extend across the cable and the connector, wherein the first optical transmission line group is provided at one end of the cable and the connector in a width direction perpendicular to the direction in which the cable extends, the one end of the cable and the connector having no electric transmission line other than the first optical line group, wherein the second optical transmission line group is provided at another end of the cable and the connector in the width direction, the another end of the cable and the connector having no electric transmission line other than the second optical transmission line group, and wherein all of the plurality of electric transmission lines are provided next to each other in the cable between the first optical transmission line group and the second optical transmission line group in the width direction, no optical transmission line being provided between or among the plurality of electric transmission lines.

2. The cable assembly according to claim 1, wherein each of the plurality of optical transmission lines is provided in parallel with one another along the direction in which the cable extends.

3. The cable assembly according to claim 1, wherein each of the plurality of optical transmission lines has a linear shape when viewed from a direction perpendicular to both of the direction in which the cable extends and the width direction.

4. The cable assembly according to claim 1, wherein the plurality of optical transmission lines are disposed symmetrically with respect to a central line of the cable parallel with the direction in which the cable extends when viewed from a direction perpendicular to both of the direction in which the cable extends and the width direction.

5. The cable assembly according to claim 1, wherein the cable is a flat cable.

6. The cable assembly according to claim 1, wherein
the connector has a plurality of electric terminals configured to be electrically connected to the respective plurality of electric transmission lines;
each of the plurality of electric terminals is arranged in compliance with a high definition multimedia interface (HDMI (registered trademark)) standard; and
the plurality of optical transmission lines are provided outside the plurality of electric terminals in the width direction in the connector.

7. The cable assembly according to claim 1, wherein
the cable has a covering part that covers the plurality of electric transmission lines and the plurality of optical transmission lines; and
a buffer material is provided between each of the plurality of optical transmission lines and the covering part.

8. A cable assembly comprising:
a cable having a shape in which a length in a first direction is longer than a length in a second direction, the second direction being perpendicular to a third direction in which the cable extends, the first direction being perpendicular to both the second direction and the third direction;
a connector that is provided at an end of the cable in the third direction in which the cable extends;
a plurality of electric transmission lines each configured to transmit an electric signal; and
first optical transmission line group consisting of one or more optical transmission lines each configured to transmit an optical signal; and
second optical transmission line group consisting of one or more optical transmission lines each configured to transmit an optical signal,
wherein the plurality of electric transmission lines and the optical transmission lines included in the first optical transmission line group and the second optical transmission line group are aligned in parallel inside the cable and the connector, and are provided so as to extend across the cable and the connector,
the first optical transmission line group is provided at one end of the cable and the connector in the first direction, the one end of the cable and the connector having no electric transmission line other than the first optical line group,
the second optical transmission line group is provided at another end of the cable and the connector in the first direction, the another end of the cable and the connector having no electric transmission line other than the second optical transmission line group, and
all of the plurality of electric transmission lines are provided next to each other in the cable between the first optical transmission line group and the second optical transmission line group in the first direction and disposed in parallel with one another in the first direction, no optical transmission line being provided between or among the plurality of electric transmission lines.

* * * * *